United States Patent [19]

Landon

[11] 4,386,675
[45] Jun. 7, 1983

[54] SELF-ENGAGING DRIVE FOR WHEELED VEHICLES

[75] Inventor: Robert K. Landon, Hemet, Calif.

[73] Assignees: Philip V. Nelson; James A. Holcomb, both of Hemet, Calif.

[21] Appl. No.: 301,041

[22] Filed: Sep. 10, 1981

[51] Int. Cl.³ .............................................. B62M 7/10
[52] U.S. Cl. ...................................... 180/221; 180/74
[58] Field of Search ............... 180/74, 205, 220, 221, 180/222, 223, 224

[56] References Cited

U.S. PATENT DOCUMENTS

| | | | |
|---|---|---|---|
| 3,841,428 | 10/1974 | Bialek | 180/74 |
| 3,891,044 | 6/1975 | Tiede | 180/222 |
| 3,905,442 | 9/1975 | O'Neill, Jr. | 180/220 |
| 3,961,678 | 6/1976 | Hirano et al. | 180/220 |
| 3,978,936 | 9/1976 | Schwartz | 180/222 |
| 4,081,048 | 3/1978 | Hendricks | 180/205 |
| 4,113,043 | 9/1978 | Palmer | 180/221 |
| 4,143,730 | 3/1979 | Desmond | 180/220 |
| 4,175,629 | 11/1979 | Kalajzich | 180/220 |
| 4,221,275 | 9/1980 | Pennebaker et al. | 180/206 |

Primary Examiner—David M. Mitchell
Assistant Examiner—Kenneth R. Rice
Attorney, Agent, or Firm—Gausewitz, Carr, Rothenberg & Edwards

[57] ABSTRACT

A drive means is described which includes an electric motor which is pivoted in a substantially balanced position by a biasing means above a wheel of a vehicle. When the motor is actuated, the reactive torque generated causes the output drive shaft from the motor to engage the wheel of the vehicle. When the motor is deactivated, the biasing means forces the drive shaft out of engagement with the wheel.

12 Claims, 6 Drawing Figures

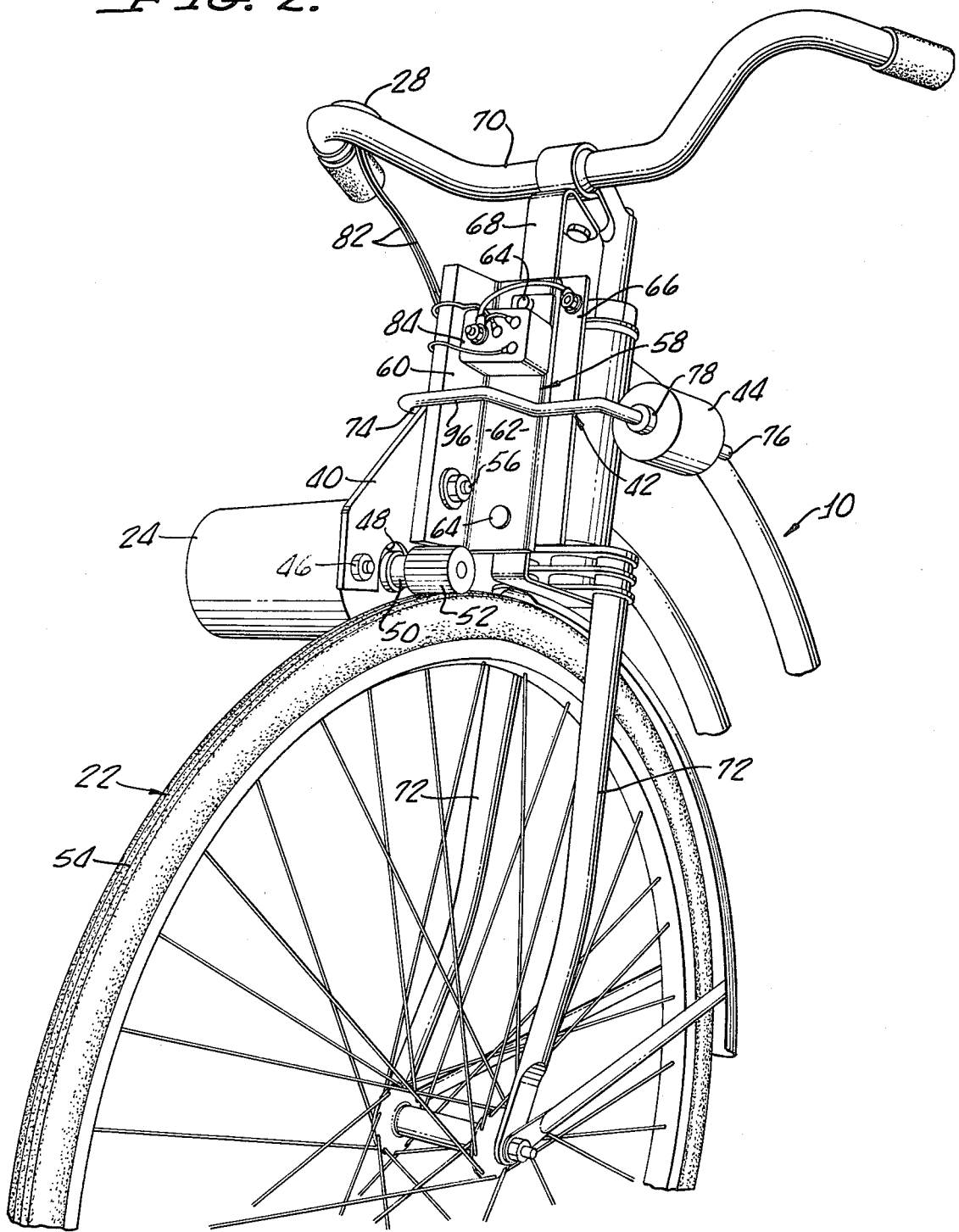

SELF-ENGAGING DRIVE FOR WHEELED VEHICLES

BACKGROUND OF THE INVENTION

This invention relates to improved means for driving wheeled vehicles, especially electric powered vehicles. More particularly, it relates to drive means which transmit rotation to a vehicle wheel by frictional engagement of the wheel with the drive means.

The propelling of lightweight vehicles, such as tricycles, bicycles, or small four-wheel vehicles, using motor power is well known. Also, it is well known to convert pedal powered or other rider propelled vehicles for motor assisted power to reduce the effort required to pedal the vehicle. In some instances, conventional pedal powered bicycles or tricycles are converted solely to motor power by disengaging the pedal drive mechanisms. However, it is often desirable to provide conventional pedal powered vehicles with optional motor power to permit the user to choose between propelling the vehicle solely by pedaling, solely by the motor, or by a combination of the two.

Optional pedal or motor powered vehicles are especially useful for elderly users, or others who are not physically conditioned to pedal all the time, or to pedal uphill, or the like. They are also desirable where there are restrictions on the use of motors, such as on sidewalks. Also, in some locales, such as quiet zones, mobile home parks, and the like, there may be noise restrictions which prohibit the use of any vehicle, except pedal powered ones or those having quiet power sources, such as electric motors.

Thus, there has been a substantial need for vehicles adapted for motor drives, especially electric motor drives, with or without auxiliary pedal drives. Also, there has been a need for means to convert conventional pedal driven vehicles to such power driven vehicles by installing motor drives thereon.

Numerous devices have been used to mount motors, including electric motors, on bicycles, tricycles, and the like, and to transmit the power from the motors to the vehicle wheels. Some use complex gearing and clutching mechanisms. Others eliminate such gears and clutches, and these propel the vehicle by frictionally engaging the output drive shaft from the motor with one of the tires of the vehicle. This latter technique is highly desirable in achieving simplicity and economy of production.

In friction engagement devices the output shaft of the motor is provided with friction means, such as a knurled cylinder, which is pressed against the surface of a tire of the wheeled vehicle with sufficient force to substantially prevent slippage between the two. Thus, when the motor turns the knurled cylinder, a corresponding rotation is imparted to the vehicle wheel.

Various techniques have been used for pressing the drive cylinder of the motor against the vehicle wheel. Typically, the drive cylinder is pressed against the tire when the motor is stopped, and then it is locked in such depressed position by some fastening means, such as a thumb screw or nut and bolt, or the like.

Other devices employ a hand lever which the rider maneuvers against a spring bias member to force the drive cylinder against the tire and hold it there during operation of the vehicle. Still other devices employ a shift lever and toggle mechanism by which the user shifts the drive cylinder against the tire to propel the vehicle and shifts it in an opposite direction to disengage for stopping.

Some devices, such as shown in U.S. Pat. No. 4,081,048, mount motors on long lever arms longer than the radius of the vehicle wheel to permit the drive cylinder to engage the tire, aided in some instances by a spring to increase the frictional engagement force.

The prior art devices for engaging the motor with the vehicle wheel suffer various deficiencies. Those which lock the drive cylinder against the tire produce much unnecessary tire wear since such engagement is often unnecessary, for example, when the vehicle is moving downhill. Also, when the motor is not being used, as when the rider is pedalling the vehicle, the motor's engagement with the tire causes a substantial drag which is tiring and essentially prevents coasting.

The devices which use a spring biased hand lever to hold the drive cylinder against the tire can be very tiring, since they must be gripped tightly at all times that the vehicle is being motor propelled. On the other hand, those vehicles which use a shift lever and toggle mechanism may require the user to shift at each start and stop of the vehicle. This may pose safety hazards when an emergency stop requires quick disengagement of the motor from the wheel.

These and other deficiencies of the prior art may be elimated or greatly alleviated in accordance with the present invention.

SUMMARY OF THE INVENTION

This invention contemplates a self-engaging drive mechanism for wheeled vehicles in which an electric motor is pivotally mounted adjacent a wheel for engagement and disengagement therewith. The motor is mounted on pivoting means which is urged by biasing means to substantially disengage the output drive shaft or cylinder of the motor from the wheel when the motor is inactivated. When the motor is activated, the reactive torque resulting from rotation of the drive shaft is sufficient to overcome the contrary torque exerted by the biasing means so that the rotating drive shaft is moved into substantial contact with the vehicle wheel and frictionally engages the wheel at its periphery. The pivot axis, the axis of rotation of the wheel, and the axis of rotation of the drive shaft are parallel to each other. The plane which includes the axis of the drive shaft and the pivot axis intersects the plane which includes the axis of the wheel and the pivot axis to form an included angle sufficiently small that the rotation and frictional contact of the shaft against the wheel tends to wedge the shaft more tightly against the wheel, thereby increasing the normal forces to substantially eliminate relative slippage therebetween.

BRIEF DESCRIPTION OF THE DRAWINGS

FIG. 2 is an enlarged perspective of a portion of the vehicle of FIG. 1 with the major components of the drive mechanism exposed;

DETAILED DESCRIPTION OF THE INVENTION

Figure 1:
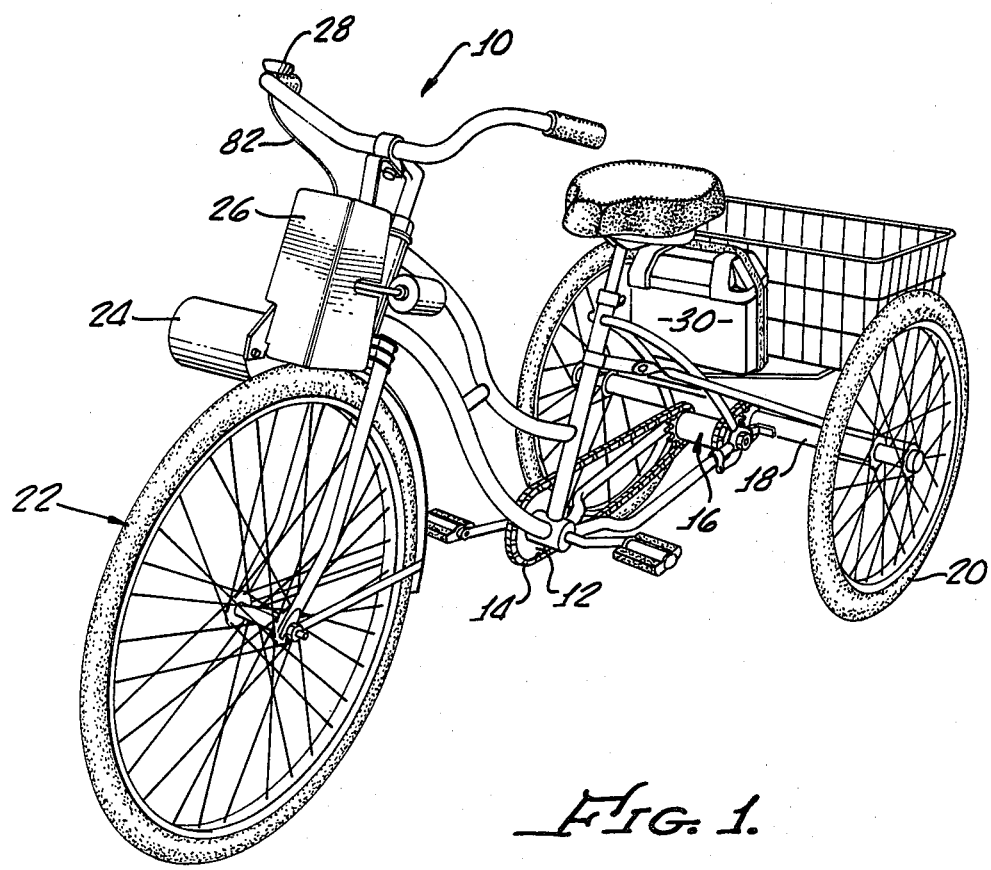
FIG. 1 is a perspective view of a three wheeled vehicle showing the positioning of a self-engaging drive mechanism in accordance with the present invention.

FIG. 1 shows a three wheeled vehicle 10 which is pedal powered through pedal and sprocket means 12 and chain 14 to drive rear sprocket means 16, rear axle 18 and rear wheels 20. The vehicle also has a front wheel 22 optionally driven by electric motor 24 as hereinafter described. FIG. 1 also shows a decorative dust cover 26 to protect the engaging means which transmits power from electric motor 24 to front wheel 22.

Electric motor 24 is energized or activated by pressing spring-loaded switch button 28, which is connected to motor 24 (and to the engaging means, as hereinafter described) to close the electrical circuit to transmit power from battery 30 to the motor. The battery 30 is mounted on support means 32 on the rear of the vehicle.

Figure 3:
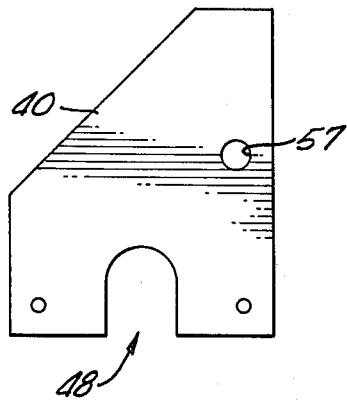
FIG. 3 is a side elevation of the motor balance plate for supporting the drive motor.
Figure 4:
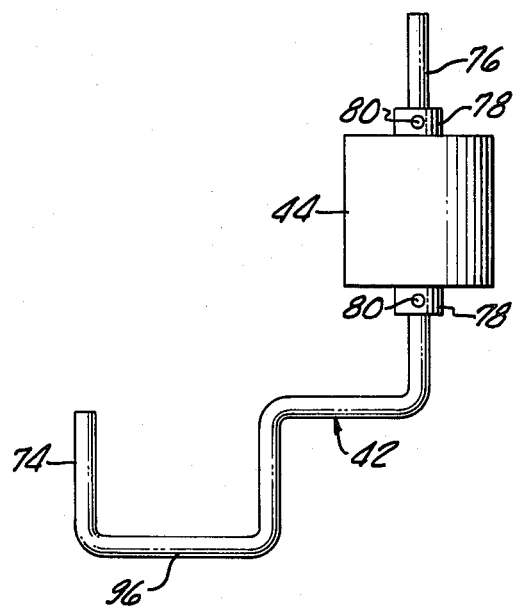
FIG. 4 shows the counterbalance weight and pivot rod for biasing the position of the motor against substantial contact with the vehicle wheel when the motor is inactivated.
Figure 5:
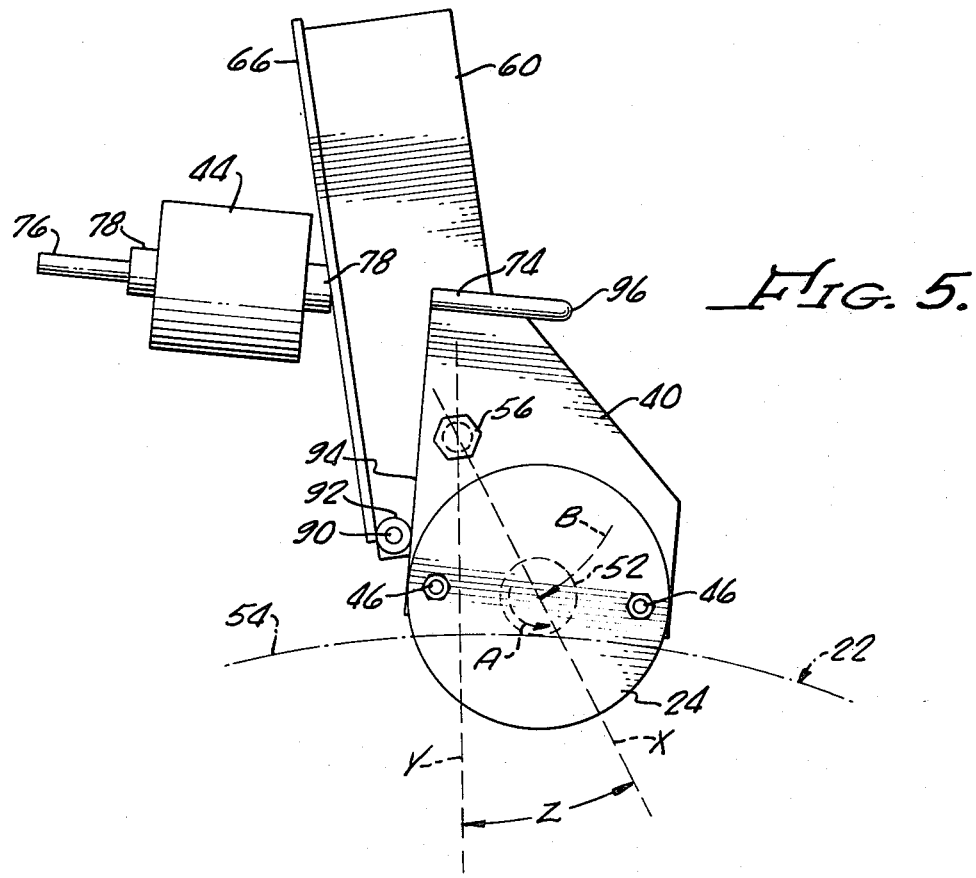
FIG. 5 shows a side elevation view of the front portion of the vehicle and the power drive mechanism viewed from the left side of FIG. 2.

FIGS. 2 and 5 show a front portion of the vehicle with the dust cover 26 removed to show how power from motor 24 is transmitted to wheel 22 when desired. FIGS. 3 and 4 show a motor balance plate 40 and a pivot rod 42 and counterbalance weight 44.

The motor 24 is mounted horizontally on motor balance plate 40 by means of fasteners 46, which may be bolts or screws, extending through the balance plate into the chassis of the motor. The lower portion of balance plate 40 defines an opening 48 through which output drive shaft 50 extends horizontally across the periphery of wheel 22. Friction drive cylinder 52 is mounted on the shaft 50 for engagement with tire 54 of front wheel 22. The friction drive cylinder 52 may comprise a knurled metal cylinder or it may be comprised of any appropriate material, such as plastic, rubber, elastic, or the like, which will provide sufficient friction to drive wheel 22.

As shown in FIGS. 2 and 5, the balance plate 40 upon which the motor 24 is mounted is pivotally connected by bearing means 56 to angle member 58. The bearing means 56 may be any convenient device, such as a bolt, extending through opening 57 in balance plate 40 (shown in FIG. 3) and fastening the plate to angle member 58, while still permitting the balance plate to pivot freely about the bearing means, for example, by placing low friction washers or spacers between the balance plate and the angle member.

The pivot axis through means 56 is substantially parallel to the axis of rotation of the vehicle wheel and to the axis of rotation of drive cylinder 52. As shown in FIG. 5, the pivot axis lies in a common plane X with the axis of cylinder 52 and in a common plane Y with the axis of the vehicle wheel. The planes X and Y intersect at the pivot axis at an acute angle Z sufficiently small that the rotation and frictional contact of the cylinder against the tire 54 tends to wedge the cylinder more tightly against the wheel, thereby increasing the normal forces between the cylinder and the wheel and thus substantially eliminate slippage. Generally, the included angle Z is less than 60° and, preferably, less than 45°.

The distance between the pivot axis and the axis of rotation of drive cylinder 52 is preferably less than the radius of the wheel. Typically, the distance is less than one-half the wheel radius, and in particularly preferred embodiments it ranges less than one-fourth the wheel radius.

Angle member 58 includes a forwardly extending planar member 60 and a transverse member 62. The transverse member 62 is mounted by fastener bolts 64 to back plate 66. The back plate 66 is mounted upon upper mounting bracket 68 which is connected to and suspended from the handle bars 70 of the vehicle. The bottom portion of back plate 66 is preferably also mounted upon a bracket (not shown) which is connected to the fork 72 of the vehicle by a clamp or bolt, or other conventional means.

Referring to FIGS. 4 and 5, an end portion 74 of pivot rod 42 is welded or otherwise fastened to the upper edge of motor balance plate 40. The pivot rod is formed to contour around angle member 58, as shown in FIG. 2, so that the terminal end portion 76 extends rearwardly of bearing means 56 about which balance plate 40 is pivoted.

Counterbalance weight 44 is mounted on terminal end portion 76 of pivot rod 42 at a position to the rear of bearing means 56. The counterbalance weight 44 is secured in a predetermined position using collars 78, each of which is held in position on the pivot rod by a set screw 80. The positioning of counterbalance weight 44 is set to substantially balance, or overbalance, the opposing weight of motor 24 and balance plate 40 on the opposite side of bearing means 56, such that when the motor is not being used the friction drive cylinder 52 will be lifted away from any substantial contact with tire 54.

In perferred embodiments of the invention the counterweight 44 is also positioned, as shown in FIG. 2, on the opposite side of the wheel from the motor 24 so that the weight of the motor is substantially balanced transversely relative to the vehicle. This minimizes the stress on bearing means 56 and lessens any tendency to bind which might interfere with the free pivoting of the mechanism.

Figure 6:
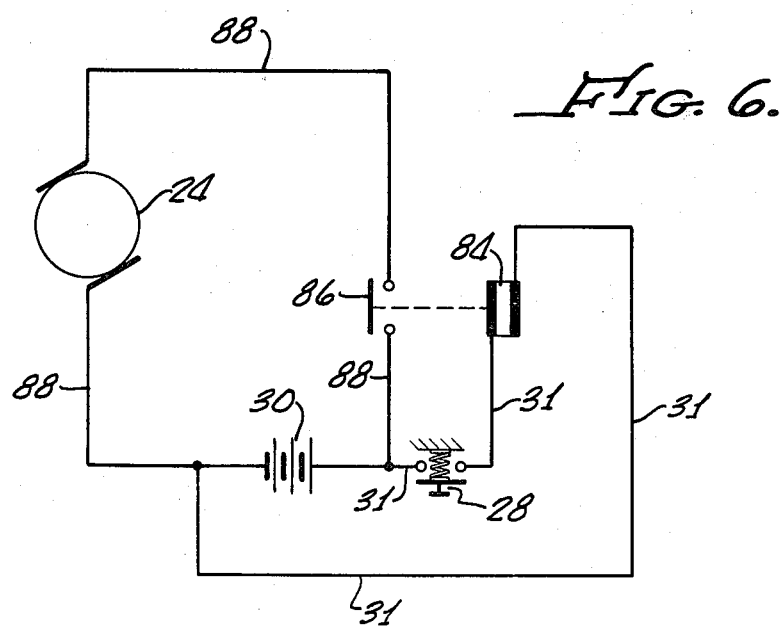
FIG. 6 is a diagram of an electrical circuit for a self-engaging power drive mechanism in accordance with the present invention.

FIG. 2 also shows the spring-loaded switch button 28 and electrical wires 82 which are connected to relay means 84. FIG. 6 shows a schematic wiring diagram to illustrate how the motor 24 is activated and deactivated. (For simplicity, the wiring connections are partially eliminated from the other figures of the drawings.) As shown in FIG. 6, when spring-loaded switch 28 is closed, relay 84 closes relay contact 86 to complete the circuit from battery 30 through motor 24 via wires 88. When it is desired to inactivate the motor, the operator of the vehicle simply releases button 28 which breaks the circuit between battery 30 and relay 84 through wires 31. This, in turn, opens relay contact 86, thus inactivating motor 24.

Referring to FIG. 5, therein is shown a post 90 welded, or otherwise rigidly fastened, to the forwardly extending planar member 60 of angle member 58. A shock absorbent rubber collar 92 is mounted about post 90 and sized to abut the rear edge 94 of balance plate 40 when the friction drive wheel 52 is fully engaged with tire 54. The post 90 and collar 92 act to dampen vibrations and movement, and also act as a stop to prevent the depressing of drive cylinder 52 excessively into tire 54 which would cause excessive wear of the tire and undue stain on the bearings of the motor. It is to be understood that the post 90 may comprise a movable bolt mounted in a slot in member 60 to permit an alternative method of adjusting the portion of maximum depression of drive cylinder 52 into the tire 54.

As previously described, when the motor is inactivated, counterbalance weight 44 tends to rotate the motor balance plate 40 counterclockwise about bearing means 56, thus lifting friction drive cylinder 52 of motor 24 out of substantial contact with the tire 54. The contour of forwardmost portion 96 of pivot rod 42 will determine how far the motor and balance plate 40 can rotate before being stopped by member 60.

When the rider or operator of the vehicle determines to use the motor power, he simply depresses the switch button 28 and activates motor 24. This produces a torque which rotates the output drive shaft 50 and friction drive cylinder 52 counterclockwise, as shown by arrow A in FIG. 5, and simultaneously produces a reactive torque tending to rotate the motor and balance plate 40 clockwise about bearing means 56, as shown by arrow B. The clockwise rotation of the motor and balance plate provide a self-engaging mechanism for forcing drive cylinder 52 downwardly against tire 54. Once cylinder 52 begins to engage tire 54, the rotation of the cylinder and the friction between the surface of cylinder 52 and tire 54 causes the cylinder to attempt to "walk" rearwardly along the periphery of the tire which, in turn, pivots balance plate 40 still further in a clockwise direction about bearing means 56 and forces drive cylinder 52 in still tighter engagement with the surface of the tire, until the rear edge 94 of balance plate 40 abuts bumper or collar 92 and stops the clockwise pivoting action.

When the rider desires to stop the vehicle, he releases the button 28 which inactivates motor 24 and terminates the torque forces imposed by the motor, thus permitting counterbalance weight 44 to pivot balance plate 40 and motor 24 counterclockwise about bearing means 56 and thus out of substantial contact with the tire 54. It is to be understood that the drive cylinder 52 may be lifted completely out of physical contact with tire 54 when the motor is inactivated, or, alternatively, it may be in contact with the tire only with such slight force as to avoid any substantial frictional interference or engagement with the tire. Thus, the front tire is rendered freewheeling, so that the full coasting capability of the vehicle is permitted without any drag being imposed by the motor.

Since the rider need not shift any levers or take any other action other than to release the spring-loaded starter button 28, the natural reflexes of the rider in an emergency will normally cause him to take the only action that is required to deactivate the motor and disengage the drive cylinder from the tire. Conversely, to engage the drive cylinder with the tire, he merely presses the button 28 to start the motor.

In location the position of counterbalance 44 the installer slides it along end portion 74 of pivot rod 42 to a position where it at least substantially balances the total weight of the motor and balance plate forward of bearing means 56. It is permissible, however, for the counterweight 44 to be so far to the rear along end portion 46 as to greatly overbalance the motor and balance plate, provided there is not such a great imbalance as to prevent downward movement of the motor by its reactive torque when the motor is activated.

Many other uses and variations of the invention will be apparent to those skilled in the art, and while specific embodiments of this invention have been described, these are intended for illustrative purposes only. It is intended that the scope of the invention be limited only by the attached claims:

What is claimed is:

1. A motor powered drive means for propelling a vehicle having a frame and at least one wheel comprising:

a motor, said motor having an output drive shaft means for frictionally engaging and rotating said wheel, means for pivotably mounting said motor on said frame permitting said drive shaft means to pivot into substantial frictional engagement with said wheel in response to reactive torque produced when said motor is activated, and counterbalance means operatively connected to said mounting means for pivoting said drive shaft means out of substantial frictional engagement with said wheel when said motor is inactivated.

2. The invention recited in claim 1 wherein the pivot axis of said pivoting means is substantially parallel to the axis of rotation of said wheel.

3. The invention recited in claim 2 wherein the axis of rotation of said drive shaft means is parallel to the axis of rotation of said wheel.

4. The invention recited in claim 2 wherein said motor is mounted generally above said wheel.

5. The invention recited in claim 4 wherein said motor is forward of said pivot axis.

6. The invention recited in claim 5 wherein said counterbalance means comprises a counterweight affixed to said mounting means to the rear of said pivot axis a distance sufficient to at least substantially balance the weight of said motor and prevent substantial frictional engagement when said motor is inactivated, said counterweight being insufficient to balance the total of the weight of said motor and the reactive torque force generated when said motor is activated.

7. The invention recited in claim 6 wherein the axis of rotation of said drive shaft means is parallel to the axis of rotation of said wheel and lies in a first common plane with said pivot axis, said axis of rotation of said wheel lies in a second common plane with said pivot axis, and said first and second common planes intersect at said pivot axis to form an included acute angle less than about 60°.

8. The invention recited in claim 7 wherein said acute angle is less than about 45°.

9. The invention recited in claim 7 wherein the distance between said pivot axis and the axis of rotation of said drive shaft means is less than the radius of said wheel.

10. The invention recited in claim 9 wherein said distance is less than one-half the radius of said wheel.

11. The invention recited in claim 9 wherein said distance is less than one-fourth the radius of said wheel.

12. The invention recited in claim 9 wherein said counterbalance weight is positioned to the opposite side of said wheel from said motor a distance sufficient to substantially balance the weight of said motor transverse to said vehicle.

* * * * *